(12) United States Patent
Bauer et al.

(10) Patent No.: US 10,226,765 B2
(45) Date of Patent: Mar. 12, 2019

(54) PROCESS FOR PRODUCING A CATALYST AND CATALYST AS SUCH

(71) Applicant: Johnson Matthey Public Limited Company, London (GB)

(72) Inventors: Juergen Bauer, Redwitz (DE); Ralf Dotzel, Redwitz (DE); Joerg Werner Muench, Redwitz (DE)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/129,645

(22) PCT Filed: Mar. 27, 2015

(86) PCT No.: PCT/GB2015/050951
§ 371 (c)(1),
(2) Date: Sep. 27, 2016

(87) PCT Pub. No.: WO2015/145181
PCT Pub. Date: Oct. 1, 2015

(65) Prior Publication Data
US 2017/0144143 A1 May 25, 2017

(30) Foreign Application Priority Data
Mar. 27, 2014 (DE) .................. 10 2014 205 760

(51) Int. Cl.
*B01D 53/94* (2006.01)
*B01J 21/16* (2006.01)
(Continued)

(52) U.S. Cl.
CPC ...... *B01J 37/0009* (2013.01); *B01D 53/9418* (2013.01); *B01D 53/9486* (2013.01);
(Continued)

(58) Field of Classification Search
None
See application file for complete search history.

(56) References Cited

U.S. PATENT DOCUMENTS 4,157,375 A  6/1979 Brown et al.
5,348,924 A  9/1994 Potter et al.
(Continued)

FOREIGN PATENT DOCUMENTS

DE  102007007325 A1  8/2008
DE  102011010106 A1  8/2011
(Continued)

OTHER PUBLICATIONS

Lachman et al.; Extruded Monolithic Catalyst Supports; Catalysis Today 14 (1992) 317-329; Elsevier Science Publishers B.V., Amsterdam.

*Primary Examiner* — Colin W. Slifka (57) ABSTRACT

To be able to produce an SCR catalyst (2), in particular one having a zeolite fraction (Z) as catalytically active fraction, in a reliable process and at the same time achieve good catalytic activity of the catalyst (2), an inorganic binder fraction (B) which is catalytically inactive in the starting state and has been treated to develop catalytic activity is mixed into a catalyst composition (4). The inorganic binder component for the binder fraction (B) is, in the starting state, preferably porous particles (10), in particular diatomaceous earth, which display mesoporosity. To effect catalytic activation, the individual particles (10) are either coated with a catalytically active layer (12) or transformed into a catalytically active zeolite (14) with maintenance of the mesoporosity.

20 Claims, 2 Drawing Sheets (51) Int. Cl.

| | | |
|---|---|---|
| *B01J 29/40* | (2006.01) | |
| *B01J 29/70* | (2006.01) | |
| *B01J 35/02* | (2006.01) | |
| *B01J 35/04* | (2006.01) | |
| *B01J 37/00* | (2006.01) | |
| *B01J 37/04* | (2006.01) | |
| *F01N 3/20* | (2006.01) | |
| *F01N 3/28* | (2006.01) | |
| *B01J 29/064* | (2006.01) | |
| *B01J 29/076* | (2006.01) | |
| *B01J 29/16* | (2006.01) | |
| *B01J 29/48* | (2006.01) | |
| *B01J 29/58* | (2006.01) | |
| *B01J 29/78* | (2006.01) | |

(52) U.S. Cl.
CPC ............. *B01J 21/16* (2013.01); *B01J 29/064* (2013.01); *B01J 29/076* (2013.01); *B01J 29/16* (2013.01); *B01J 29/40* (2013.01); *B01J 29/48* (2013.01); *B01J 29/58* (2013.01); *B01J 29/7007* (2013.01); *B01J 29/7015* (2013.01); *B01J 29/78* (2013.01); *B01J 29/783* (2013.01); *B01J 29/7815* (2013.01); *B01J 35/023* (2013.01); *B01J 35/04* (2013.01); *B01J 37/04* (2013.01); *F01N 3/2066* (2013.01); *F01N 3/2828* (2013.01); *B01D 2255/2065* (2013.01); *B01D 2255/20707* (2013.01); *B01D 2255/20723* (2013.01); *B01D 2255/20738* (2013.01); *B01D 2255/20761* (2013.01); *B01D 2255/20776* (2013.01); *B01D 2255/50* (2013.01); *B01J 2229/186* (2013.01); *B01J 2229/42* (2013.01); *B01J 2229/62* (2013.01); *B01J 2229/64* (2013.01); *F01N 3/28* (2013.01)

(56) References Cited

U.S. PATENT DOCUMENTS

| | | |
|---|---|---|
| 8,105,544 B2 | 1/2012 | Ohno et al. |
| 8,178,063 B2 | 5/2012 | Ahn et al. |
| 8,263,032 B2 | 9/2012 | Andersen et al. |
| 8,603,423 B2 | 12/2013 | Andersen et al. |
| 8,603,432 B2 | 12/2013 | Andersen et al. |
| 8,609,047 B2 | 12/2013 | Dotzel et al. |
| 8,641,993 B2 | 2/2014 | Dotzel et al. |
| 8,871,667 B2 | 10/2014 | Kikuchi et al. |
| 2002/0041845 A1 | 4/2002 | Oku et al. |
| 2006/0070917 A1 | 4/2006 | McCarthy et al. |
| 2006/0089254 A1 | 4/2006 | McCarthy et al. |
| 2007/0077189 A1* | 4/2007 | Hubig ................ B01D 53/9418 423/239.2 |
| 2012/0122660 A1 | 5/2012 | Andersen et al. |
| 2013/0296625 A1 | 11/2013 | Ghosh et al. |
| 2014/0124992 A1 | 5/2014 | Kikuchi et al. |
| 2014/0147673 A1 | 5/2014 | Kunieda et al. |

FOREIGN PATENT DOCUMENTS

| | | |
|---|---|---|
| DE | 102012213639 A1 | 2/2013 |
| EP | 1103525 A1 | 5/2001 |
| GB | 2017520 A | 10/1979 |
| GB | 2511178 A | 8/2014 |
| GB | 2511706 A | 9/2014 |
| JP | 2001180928 | 7/2001 |
| JP | 20011180928 A | 7/2001 |
| JP | 2002003215 A | 1/2002 |
| WO | 9928032 | 6/1999 |
| WO | 0066263 | 11/2000 |
| WO | 200066263 A1 | 11/2000 |
| WO | 2009001131 A1 | 12/2008 |
| WO | 2011092517 A1 | 8/2011 |
| WO | 2011092519 A1 | 8/2011 |
| WO | 2012166868 A1 | 12/2012 |
| WO | 2014027207 A1 | 2/2014 |

\* cited by examiner

PROCESS FOR PRODUCING A CATALYST AND CATALYST AS SUCH

CROSS-REFERENCE TO RELATED APPLICATIONS

This national stage application claims priority benefit of PCT Patent Application No. PCT/GB2015/050951, filed Mar. 27, 2015 and German Patent Application 102014205760.4, filed Mar. 27, 2014, the disclosures of which are incorporated herein by reference in their entireties for all purposes.

The invention relates to a process for producing an extruded catalyst and also a catalyst as such, in particular an SCR catalyst.

To reduce nitrogen oxide in exhaust gases from both stationary and mobile combustion plants, in particular in motor vehicles, the known selective catalytic reduction (SCR) is used. In this, nitrogen oxides are reduced in the presence of ammonia and oxygen to nitrogen. Various catalyst types and systems are known in principle for accelerating this reaction. One class of catalysts which have recently been in focus, especially for mobile use in motor vehicles, are zeolite-based catalysts. Mention may here be made of, in particular, iron- or copper-exchanged zeolites, preferably of the type ZSM-5 (MFI), beta (BEA), chabazite (CHA), or else further zeolites having the framework structures AEI, ERI, FER as catalytically active components.

Owing to their specific morphology having a high microporosity per unit volume, the zeolites have a comparatively large surface area so that they are suitable for a compact construction. The catalytic activity is also increased by the incorporated copper or iron ions.

The catalytic converters nowadays used in motor vehicles are usually catalyst washcoats coated on inert ceramic substrates, particularly honeycomb ceramic substrates. Alternatively, modern catalytic converters can be extruded ceramic catalysts, typically in the form of a honeycomb body. In operation, the exhaust gas to be cleaned flows through channels in the coated substrate or extruded catalyst body.

Here, in-principle, a distinction is made between all-active extrudates and coated supports, known as "washcoats". In the case of the all-active extrudates, the extruded body is comprised of a catalytically active catalyst composition, i.e. the individual channel walls of the catalyst are made of solid catalytically active material. In the case of washcoats, a catalytically inert extruded support body is coated with the actual catalytically active catalyst material. This is usually effected by dipping the extruded support body into a suspension containing the catalyst material.

To produce the extruded catalyst body, a ceramic extrusion composition whose rheological properties have been set so as to be suitable for the extrusion process is generally provided. This extrusion composition is a plastic (i.e. easily shaped or mouldable), viscous composition. To set the desired rheological properties of the extrusion composition and also the mechanical properties of the extrudate, binders or additives are typically added to the extrusion composition.

In the case of all-active extrudates, the catalytically active component is present in the extrusion composition. In the case of conventional catalysts which are based, for example, on the titanium dioxide/vanadium pentoxide system, the proportion of binder is typically in the range of a few percent by weight, for example in the range from 2 to 10% by weight.

However, when zeolites are used as catalytically active component, extrusion is made more difficult since the zeolites are comparatively difficult to extrude because of their specific properties and their morphology. A further problem is also the reduced mechanical stability of zeolite-based catalyst systems. In the light of this background, it is necessary for, in comparison with the titanium dioxide/vanadium pentoxide systems, significantly higher proportions of binder to be used in order to set the rheological properties appropriate for extrusion and to achieve sufficient mechanical stability.

However, this brings about an overall decrease in the catalytically active component relative to the total catalyst, so that the specific catalytic activity per unit volume is reduced overall as a result of the increased proportion of binder.

For the present purposes, a binder is generally a component which gives the finished catalyst strength and stability after a sintering process. The binder form, in particular, sinter bridges to the catalytically active component or brings about mechanical interengagement of these components.

Proceeding from this, it is an object of the invention to make possible a preferably zeolite-based catalyst, in particular a SCR catalyst, which displays a high catalytic activity and can preferably also be extruded in a reliable process.

The object is achieved according to the invention by a process for producing an extruded catalyst, in particular an SCR catalyst, having the features of claim 1. Here, a catalyst composition to be extruded is provided and is extruded to produce a catalyst body. To set required rheological properties for extrusion, the catalyst composition comprises a binder fraction composed of at least one inorganic binder component consisting of particles. The binder fraction is initially catalytically inactive in a starting state, with at least part of this binder fraction which is catalytically inactive in the starting state being treated to develop catalytic activity. For the present purposes, starting state means the pulverulent state of the binder component.

This process is based firstly on the idea of using a high proportion of an inorganic binder in order to ensure desired stability of the final shaped catalyst body. The use of suitable inorganic binder components ensures that the extrusion process is made possible in a reliable manner.

Furthermore, the invention is based on the idea of making the catalytic activity of the catalyst sufficiently high despite the comparatively high proportion of binder required by giving the initially inactive at least one binder component catalytic activity by means of a suitable treatment. This treatment is preferably carried out before mixing of the binder fraction into the catalyst composition to be extruded. These inorganic binder components mixed into the catalyst composition are generally a pulverulent mineral material consisting of individual particles. These powder particles are therefore preferably treated in order to achieve the desired catalytic activation of the initially catalytically inert particles before mixing into the catalyst composition. Therefore, when the term "particles" is employed in the following, such powder particles are meant.

Overall, this allows an extrudable catalyst having high stability and high catalytic activity to be produced in a reliable process.

In a useful embodiment, a conventional catalytically active component is mixed in addition to the binder component into the catalyst composition. This is preferably a catalytically active zeolite and/or a catalytically active molecular sieve. For the purposes of the present invention, zeolites are generally zeolites as per the zeolite atlas of the Structure Commission of the International Zeolite Association (IZA-SC). Apart from the classical Al—Si zeolites, these also include, in particular, the SAPO and AlPO zeolite types. The catalyst is therefore preferably a zeolite-based catalyst.

As an alternative, a titanium-vanadium system or else a mixed oxide system, for example one based on cerium-zirconium mixed oxides, is used as catalytically active component.

The rheological properties of the catalyst composition are decisively influenced by the geometric shape, i.e. the morphology, of the individual added particles. These are therefore preferably selected in an appropriate manner so that they have a morphology suitable for the desired rheological properties.

In a preferred embodiment, the particles have, at least in the catalytically inactive starting state, a non-zeolitic framework structure.

The particles therefore differ from conventional catalytically active components. For this reason, when an active component is mixed into the catalyst composition, they are at least different from this active component. Furthermore, the particles are typically, at least in the starting state, present as amorphous particles, unlike the usually crystalline conventional active components.

As a result of this particle structure deviating from the active component, it is firstly ensured that the desired improvement in the rheological properties is achieved and at the same time the function as binder for the mechanical strength of the shaped body produced is ensured.

In a preferred embodiment, the particles themselves have a porosity. This improves accessibility for the exhaust gas to be purified into deeper volume layers and thus mass transfer, which is advantageous for the desired high catalytic activity.

In a useful embodiment, the particles have a greater pore width compared to a zeolite. In particular, the particles have a mesoporosity or macroporosity having a pore width of >2 nm, preferably >5 nm. For the purposes of the present invention, the term mesoporosity refers to pores having a pore width (pore diameter) in the range from 2 nm to 50 nm and the term macroporosity refers to pore widths of greater than 50 nm. The particles of the binder component therefore differ in terms of their morphology, in particular in terms of the pore width, from a zeolite or from the active component.

Here, the pore width of a zeolite is the largest diameter of a ring structure of the zeolite. The framework structure of suitable zeolites forms open pores or pore channels. These are formed and bounded by a ring structure of the usually tetrahedral basic building blocks of the zeolite. In general, a distinction is made between small-pored (up to 8-membered ring) zeolites, medium-pored (up to 10-membered ring) zeolites, wide-pored (up to 12-membered ring) zeolites and ultrawide-pored zeolites (more than 12-membered ring). The maximum ring size is at present a 24-membered ring, which corresponds to a pore width of about 1.2 nm. Suitable catalytically active zeolites are typically small- or medium-pored zeolites having a pore width of from about 0.3 to 0.7 nm.

The catalytic activity is improved overall by the mesoporosity or macroporosity of the particles of the binder component, since the exhaust gas to be purified can also penetrate via this porosity into deeper layers of the catalytically active walls of the extruded catalyst. Supply even to deeper-lying catalytically active sites of the catalyst effectively also therefore occurs via these wide pores, so that a larger proportion of the catalytically active composition can be utilized. In the case of conventional catalysts, namely the catalytic reaction occurs first and foremost only in the direct surface region of the flow channels in the catalyst through which the exhaust gas to be purified flows. Since the binder fraction is generally distributed homogeneously over the total volume of the catalyst, the binder fraction therefore effectively forms flow and supply paths which extend into the volume of the catalyst and from which penetration into the microporosity of the zeolite is then made possible.

To attain the desired catalytic activity of the binder fraction, a first preferred variant provides for the initially catalytically inert particles of the binder component to be coated with a catalytically active layer, preferably a zeolite layer. The catalytically activated particles therefore consist, in this variant, of a catalytically inert core and a catalytically active layer. The respective particles which have a defined particle shape are therefore given the desired catalytic activity by the catalytic coating while maintaining the particle shape. Processes known per se can be used for forming the layer, for example deposition of catalytically active particles, in particular zeolites, from a suspension or chemical growing-on by hydrothermal crystallization.

The particles typically have a particle size in the range from a few μm to some 10 μm, for example in the range from 1 to 100 μm. The layer thickness, on the other hand, is a fraction thereof and is in particular below 20%, preferably below 10%, of the average particle diameter and is in particular in the range from 0.5 μm to 10 μm. For the present purposes, the particle diameter is the average diameter of the respective particles. In the case of rod-like particles which extend in a longitudinal direction, the particle diameter is the average diameter in a cross-sectional plane perpendicular to the longitudinal direction.

In a preferred embodiment, the particles are at least partly and preferably completely transformed into a catalytically active zeolite structure while maintaining their particle shape. The catalytic activity is achieved, in particular, by a metal ion exchange customary for zeolites, in particular with Cu or Fe ions. The particular advantage of this transformation is that the original particle shape of the powder particles, which is particularly important for setting of the desired rheological properties, is maintained. For the purposes of the present invention, the term particle shape refers, in particular, to geometric structures in the region of the size of the individual particle sizes, i.e. particularly in the μm range, which can also be referred to as macromorphology. On the other hand, geometric structures in the upper measurement range, i.e., for example, in the range from a few nm up to 1 μm, are also encompassed by the term particle shape, which is maintained. This particle shape, which is critical to the rheological properties but also to the formation of supply channels, is therefore maintained. At the same time, the framework structure of a zeolite is formed by this transformation. The term transformation therefore refers to a chemical transformation with maintenance of the (mesoscopic and macroscopic) morphology of the binder particles. As framework structure, the tetrahedral crystal structure typical of zeolites in particular a structure made up of $SiO_{4/2}$—$AlO_{4/2}$ tetrahedra, is formed. Overall, particles having a zeolitic framework structure or nanostructure but a non-zeolitic morphology are therefore formed.

To develop the catalytic activity, metal ions, in particular Cu or Fe ions, are, in a useful embodiment, introduced into the zeolitic microstructure by ion exchange in order then to form catalytically active sites.

Here too, it is particularly advantageous that the (meso) porous initial structure of the particles is maintained, so that the advantages in respect of improved supply to even deeper-lying wall regions achieved by the porosity is maintained.

The transformation into a zeolite is known in principle. A prerequisite is that the particles consist of a silicon oxide-containing and/or aluminium oxide-containing material which is then transformed with addition of further components suitable for structure formation and at elevated temperature and pressure into the desired zeolite microstructure in a synthesis.

The transformation is carried out here by means of the abovementioned hydrothermal crystallization. In this transformation, the respective particle is generally employed as substrate for a support-assisted crystallization. When kieselguhr particles (diatomaceous earth) is used, the amorphous $SiO_2$ present in this particle is utilized as silicon source for zeolite formation. The particles are in this case introduced into an aqueous reaction mixture which contains further components, in particular an aluminium source and usually an organic template or a plurality of organic templates. These further components therefore form reactants for the desired network formation. The transformation and microstructure formation is then effected by hydrothermal crystallization at an elevated temperature of typically 80 to 200° C. and autogenous pressure over a reaction time of typically a number of days, for example from one to ten days. The crystalline material obtained in this way after the hydrothermal treatment is subsequently washed, dried and calcined at temperatures of from 400 to 800° C. The calcination serves, in particular, to burn out the organic reactants (templates). The transformation can sometimes occur only in regions close to the surface, so that a zeolitic surface layer is formed. As an alternative, the transformation is carried out to completion, so that the entire particle acquires a zeolite framework structure.

The transformation preferably forms a zeolite having the framework structure MFI (e.g. ZSM-5), BEA (e.g. beta), CHA (chabazite), AEI (e.g. ALPO 18), ERI (e.g. erionite) or FER (e.g. ferrierite) (FER is a medium pore molecular sieve). After the transformation, the zeolites are preferably exchanged with iron or copper. In particular, the transformation forms the same zeolite type as is also used for the catalytically active zeolite component. This catalytically active zeolite component and the binder therefore differ in this case in their mesomorphology and macromorphology.

A porous glass, silica gel or aluminium oxide, for example, is used in this case as starting particles for the binder component. Clay minerals and in a preferred embodiment diatomaceous earth, which is particularly suitable for setting the desired rheological properties of the catalyst composition, are also used. If necessary, mixtures of a plurality of such binder components are also used for the binder fraction.

Finally, in a further embodiment, a pillared clay material, known as pillared clays (PILC), is used as binder component. This clay material generally has two-dimensional clay layers separated from one another at a spacing by inorganic pillars. The pillars consist of, for example, titanium oxide or aluminium oxide. Furthermore, catalytically activity cells are preferably intercalated in the free spaces formed by the inorganic pillars between the clay layers in order to provide the catalytic activity. For this purpose, iron, copper, manganese or cerium is intercalated if desired.

In a useful embodiment, the binder component is a diatomaceous earth. This is particularly suitable for setting the desired rheological properties. This applies both to the variant having the coated particles and also to the variant having the particles which have been transformed into a zeolite.

A particular advantage of diatomaceous earth is its high porosity. Experiments have shown diatomaceous earth to be particularly suitable. This is employed, in particular, for the transformation into a zeolite. A zeolite having the macroscopic morphology of diatomaceous earth and having a suitable mesoporosity and macroporosity is therefore formed, so that the desired accessibility of deeper-lying catalyst levels is achieved.

According to the invention, the object is also achieved by a catalyst having the features of claim 13. This is, in particular, an SCR catalyst which has preferably been produced as an all-active extrudate by the above-described process. It comprises, in particular, at least one zeolite as catalytically active component and an inorganic binder fraction which comprises an inorganic binder component which has been at least partly catalytically activated.

The advantages and preferred embodiments which have been described in connection with the process, in particular in respect of the composition of the catalyst and in particular the embodiments of the binder fraction and the binder component, can also be applied analogously to the catalyst.

The catalyst is, in particular, an extruded (honeycomb) catalyst. In alternative embodiments, the catalyst is configured as a plate catalyst, as washcoat or as extruded pellets (loose material). The catalytically active catalyst composition forming the actual catalyst has, in the finished state, in each case the composition which has also been described for the process.

The inorganic binder fraction is usefully in the range from 10 and 80% by weight and in particular in the range from 15 to 50% by weight, in each case based on the total weight of the finished, sintered catalyst. In the boundary region, the catalytic activity is therefore formed exclusively by the catalytically activated binder component.

The high proportion by mass of the binder component is made possible only by the subsequent activation of the previously inactive binder fraction in order to ensure, at the same time, an overall high total activity of the catalyst at the given volume. The binder fraction is therefore fundamentally different from the zeolitic active catalyst component in terms of its mesomorphology or macromorphology.

It is useful for a major part, preferably more than 80%, of the total inorganic binder fraction to be catalytically activated. In particular, the entire inorganic binder fraction is catalytically activated. Here, preference is also given to using combinations of various catalytically activated binder components.

Overall, many advantages are achieved by appropriate selection of binder components.

Here, in particular, the improved access for the exhaust gas to be purified to the catalytically active cells of the zeolite can be seen. As a result, a higher diffusion rate of the exhaust gas to be purified into the volume of the catalyst is achieved, giving overall improved catalytic efficiency and thus full utilization of the comparatively expensive zeolitic catalytic material. The binder fraction is generally homogeneously distributed in the catalyst. The usually μm-sized zeolitic crystals are better utilized for the catalytic reaction. This can also be employed to give smaller construction spaces for the catalyst while maintaining the same total catalytic activity, which is of particular importance in the motor vehicle sector.

Finally, these improved properties of the catalyst are critically also supported by the fundamental ability to produce an extruded all-active body in a reliable process.

It is in principle possible to use only porous inorganic binder components such as suitable clay minerals, diatomaceous earth and/or pillared clay minerals (PILC) without catalytic activation as inorganic binder component. Even without catalytic activation of the binder fraction, a catalyst having improved catalytic activity is achieved as a result of the supply channels introduced. Good extrudability and a high mechanical stability are also achieved by means of the inorganic binder. Rights to file a sub-application directed to the use of such inorganic binder components, as described here but without catalytic activation, for a catalyst, in particular an SCR catalyst, and a production process are reserved.

In addition to the catalytically activated binder fraction, the catalyst preferably contains at least one catalytically active component. Various catalyst systems are known in principle for the catalysts. For the present purposes, catalyst systems are the component systems comprising the at least one catalytically active component which are partly responsible for the catalytic activity.

In a preferred first variant, a crystalline molecular sieve is used as the at least one catalytically active component. This is preferably present in a proportion of 20-80% by weight.

For the present purposes, crystalline molecular sieves are, in particular, zeolites in the narrower sense, namely crystalline aluminosilicates. In addition, crystalline molecular sieves also include further molecular sieves which are not aluminosilicates but have a zeolitic framework structure as per the zeolite atlas of the Structure Commission of the International Zeolite Association (IZA-SC). This applies particularly to silicoaluminophosphates (SAPO) or aluminophosphates (ALPO), which are likewise listed in the zeolite atlas mentioned.

As catalytically active components, use is here made of, in particular, molecular sieves having the framework structure CHA, in particular chabazite, AEI, in particular ALPO 18 or and aluminosilicate form thereof, e.g. SSZ-39, ERI, MFI, BEA, FAU, AFX or FER (the nomenclature used here is based on the nomenclature used in the zeolite atlas).

Among the crystalline molecular sieves having the framework structures as per the zeolite atlas, a distinction is generally made between small-pored, medium-pored and large-pored crystalline molecular sieves. Small-pored molecular sieves are sieves which have a maximum pore opening having a ring structure composed of eight tetrahedral atom structures. Medium-pored and large-pored molecular sieves are molecular sieves in which the maximum pore openings are formed by a ring opening having a ring of not more than 10 (medium-pored) or not more than 12 (large-pored) tetrahedrally arranged atom structure. The framework structure BEA mentioned is a large-pored framework structure, MFI is a medium-pored structure and CHA is a small-pored structure. The FAU framework structure mentioned is likewise a large-pored structure, preferably a Y-zeolite. AEI is a small-pored framework structure, and preference is given here to using a zeolite having the designation SSZ-39. FER is a medium-pored framework structure and preference is given to using ferrierite or ZSM-35 as material. ERI—is a small-pored structure and preference is given to using erionite as material. AFX is a small-pored framework structure and preference is given to using SSZ-16 as material. The framework structures BEA, MFI and FAU (here in particular zeolite-Y) are preferably used as hydrocarbon traps. All framework structures and materials mentioned can be used as SCR catalysts; they are appropriately activated by means of a metal, in particular, ion-exchanged with copper and/or iron and/or cerium, preferably activated with copper or iron.

It is generally useful for the molecular sieve to contain a metallic activator (promoter). This is in particular copper, iron or cerium or a mixture thereof. The molecular sieve is in particular a molecular sieve, in particular zeolite, exchanged with such metal ions. As an alternative to the ion-exchanged molecular sieve in which the metal ions are incorporated into the framework structure, it is also possible for these metal activators not to be incorporated into the framework structure and thus be effectively present as "free" metals or metal compounds (e.g. metal oxides) in the individual channels of the molecular sieves, for example as a result of impregnation of the molecular sieve with a solution containing the compound. A combination of ion-exchanged metals and free metal compounds in the molecular sieve is also possible.

As an alternative to the crystalline molecular sieves, it is in principle also possible to use another catalyst system having a catalytically active component. The catalyst in this case preferably has a catalytic, non-zeolitic system based on a base metal.

In a first embodiment, the catalyst is in this case a titanium-vanadium-based catalyst having vanadium as catalytically active component.

Overall, different titanium-vanadium systems are used in various embodiments. In particular, oxidic systems having mixtures of titanium dioxide ($TiO_2$) and vanadium pentoxide ($V_2O_5$) are used. As an alternative, the titanium-vanadium system comprises vanadium-iron compounds as catalytically active component, in particular comprising iron vanadate ($FeVO_4$) and/or iron aluminium vanadate ($Fe_{0.8}Al_{0.2}VO_4$). Such an arrangement is disclosed in WO 2014/027207 A1 (the entire contents of which is incorporated herein by reference).

The oxidic systems are, in particular, titanium-vanadium-tungsten systems, titanium-vanadium-tungsten-silicon systems, titanium-vanadium-silicon systems. In the case of the second group comprising vanadium-iron compounds, these are titanium-vanadium-tungsten-iron systems, titanium-vanadium-tungsten-silicon-iron systems or titanium-vanadium-silicon-iron systems.

The titanium/vanadium weight ratio (Ti/V) is usefully in the range from 35 to 90. In the case of oxidic titanium-vanadium systems, the weight ratio of titanium dioxide to vanadium pentoxide ($TiO_2/V_2O_5$) is typically in the range from 20 to 60.

The titanium-vanadium system is usually present in a proportion by weight of from 70 to 90% by weight, based on the finished catalyst. The remaining 10 to 30% by weight are made up by the binder components and if required filler components or fibres.

In a second variant of the catalytic system based on a base metal, a tungsten oxide-cerium oxide system or a stabilized tungsten oxide-cerium oxide system ($WO_3/CeO_2$) is used for the catalytic system.

The stabilized tungsten-cerium system is in particular a zirconium-stabilized system containing Ce-zirconium mixed oxides. A transition metal, in particular iron, is preferably distributed in such a support material. The transition metals used are, in particular, selected from the group consisting of Cr, Ce, Mn, Fe, Co, Ni, W and Cu and in particular selected from the group consisting of Fe, W, Ce and Cu.

The catalytic system is in particular an Fe—W/CeO$_2$ system or an Fe—W/CeZrO$_2$ system, as has, in particular, been described in connection with FIG. 3 of WO 2009/001131, which is hereby fully incorporated by reference. The proportion of the transition metal in the catalyst is preferably in the range from 0.5 to 20% by weight, based on the total weight of the catalyst.

The various catalytic systems described here are either used individually as desired or in combination. In particular, a mixture of the titanium-vanadium-based system with crystalline molecular sieves is used here. In particular, such a mixed catalyst comprises, as first component, an aluminosilicate or iron silicate molecular sieve, which is optionally in the H+ form or has been ion-exchanged with one or more transition metals, in particular with iron. The second component is a vanadium oxide on a metal oxide support of which the metal is selected from among aluminium, titanium, zirconium, cerium, silicon and combinations thereof. The support material of the second component is in particular titanium oxide. The first component is, in particular, an iron-exchanged MFI, BEA or FER aluminosilicate molecular sieve (zeolite). The ratio of the first component to the second component in this mixture is in the range from 5:95 to about 40:60.

The catalyst is in particular an extruded catalyst, preferably a honeycomb catalyst. The catalyst body is, in one embodiment, coated with a catalytically active coating which is either identical to or different from the extruded body. Such a coating is, for example, applied as a washcoat as disclosed in DE 10 2012 213 639 A1 (the entire contents of which is incorporated herein by reference). This is, in particular, an extruded SCR honeycomb catalyst. In an alternative embodiment, no coating is applied.

In a preferred embodiment, the extruded catalyst, in particular the extruded honeycomb catalyst, is configured as a wall flow filter in which the exhaust gas flows through porous walls during operation. In contrast thereto, the catalyst body of a flow-through monolith (which is likewise frequently configured as a ceramic honeycomb catalyst) has flow channels for the exhaust gas arranged in the longitudinal direction. The formation of a wall flow filter is effected by means of suitable setting of the porosity. Such a wall flow filter is described, for example, in DE 10 2011 010 106 A1 (the entire contents of which is incorporated herein by reference).

The catalyst is preferably configured as an SCR catalyst and thus has catalytic activity in respect of the desired DeNOx reaction.

However, the concept described here with the catalytically activated binder component is not restricted to the use for SCR catalysts. This concept is suitable in principle for all types of catalysts in order to improve the catalytic activity.

In particular, the catalyst is, for example, a hydrocarbon trap, in particular without additional catalytic coating. Such catalysts are also referred to as cold-start catalysts since, owing to their ability to store hydrocarbons, they control the proportion of HC in the exhaust gas during the start phase of an internal combustion engine. Such a cold-start catalyst is described, for example, in WO 2012/166868 A1 (the entire contents of which is incorporated herein by reference). Such a catalyst is, in particular, configured as an extruded honeycomb catalyst comprising a crystalline molecular sieve, in particular as a mixture of such a molecular sieve with a noble metal, in particular palladium (Pd). The noble metal can also be added together with a base metal to the zeolite. Studies have shown that palladium-impregnated crystalline molecular sieves, in particular without iron, likewise display the desired properties of a cold-start catalyst. Such cold-start catalysts display, for example, good NO$_x$ storage and conversion capability with high selectivity for N$_2$ at low temperatures, a good storage capability and conversion of hydrocarbon at low temperatures and an improved carbon monoxide oxidation activity.

As an alternative to these preferably uncoated extruded catalysts configured as hydrocarbon traps, the catalyst is configured as a coated, extruded honeycomb catalyst capable of acting as hydrocarbon trap. Once again, the catalyst preferably comprises crystalline molecular sieves, preferably, for example, in the H$^+$ form and in particular "unmetallized", i.e. without metallic activators. As an alternative, the crystalline molecular sieves contain palladium and/or silver. Such extruded honeycomb bodies are, in this embodiment, provided with a catalytically active coating, in particular to form a diesel oxidation catalyst, a three-way catalyst, or it is converted into a wall flow filter which is subsequently coated with an oxidation catalyst in order to convert it, in a manner similar to a diesel oxidation catalyst, into a catalysed soot filter (CSF). An example of a three-way catalyst may be found in WO 2011/092517 A1 (the entire contents of which is incorporated herein by reference) and an example of an extruded diesel oxidation catalyst and of an extruded catalysed soot filter may, for example, be found in WO 2011/092519 (the entire contents of which is incorporated herein by reference).

Embodiments of the invention are illustrated below with the aid of the figures. In the figures

Figure 1:
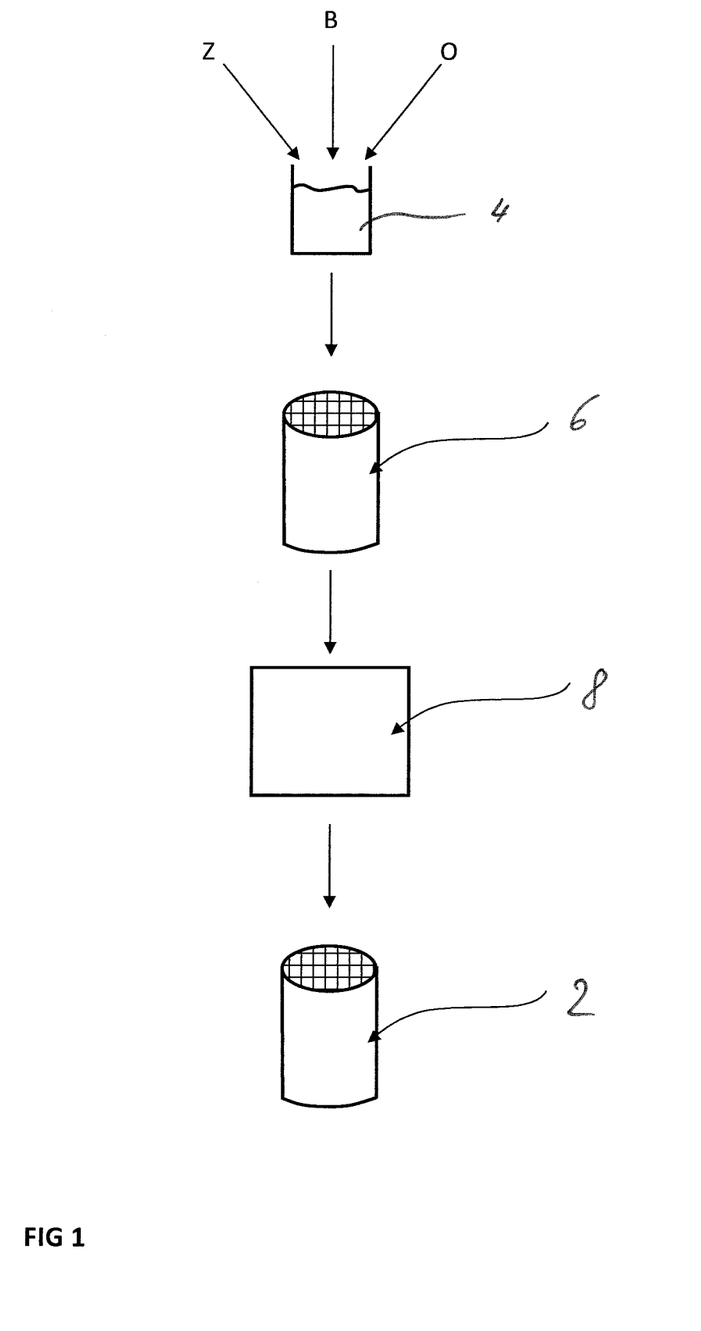
FIG. 1 shows a simplified schematic diagram to illustrate the production process.

According to FIG. 1, an extrusion process is provided for producing a catalyst 2. A catalyst composition 4 comprising, as main component, a catalytically active zeolite fraction having a zeolite Z as catalytically active component, an inorganic binder fraction B and in addition usually a certain proportion of organic binders O or possibly further additives is initially provided. The zeolite fraction and the inorganic binder fraction B are homogeneously mixed as starting powder together with the organic binder fraction O and optionally further components to give the extrudable catalyst composition 4. The rheological property of the catalyst composition 4 for the subsequent extrusion is appropriately set via the binder fractions B, O, so that the catalyst composition 4 has a plasticizability suitable for the extrusion tool.

A catalyst body 6 is subsequently produced as all-active extrudate by extrusion of this catalyst composition 4 and this catalyst body 6 is firstly dried and subsequently sintered in a furnace 8, so that at the end the ceramic catalyst 2 has been formed as extruded all-active catalyst. In the example, this is a honeycomb catalyst having, for example, a cylindrical basic geometry. The zeolite fraction preferably consists of an iron- or copper-exchanged zeolite Z, in particular of the ZSM-5, beta or chabazite type. The zeolite fraction can also consist of a mixture of such zeolites Z.

The binder fraction B is preferably a powder which is catalytically inactive in the original state and consists of individual particles 10, in particular of a diatomaceous earth. These particles 10 are catalytically activated by means of a pre-treatment during which they maintain their morphology. The particles 10 are preferably porous particles. The particles 10 overall have a mesoporosity having a pore width p (average pore diameter) which is typically >5 nm. A diatomaceous earth, in particular, is employed as starting material for these particles 10. The particles 10 usually have an (average) particle diameter d in the range from a few μm to some 10 μm.

Figure 2:
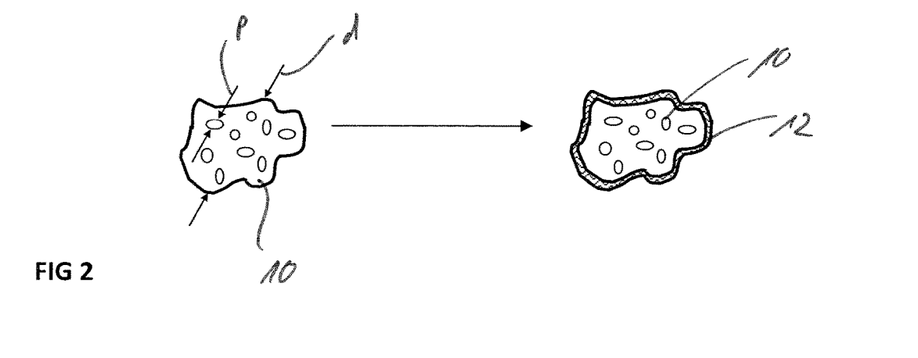
FIG. 2 shows a schematic diagram to explain the production of particles for the binder component, in which the particles are provided with a catalytically active layer.

In a first embodiment shown in FIG. 2, the particles 10 are coated with a catalytically active layer 12 and catalytically activated in this way. The layer 12 is, in particular, a zeolite layer.

Figure 3:
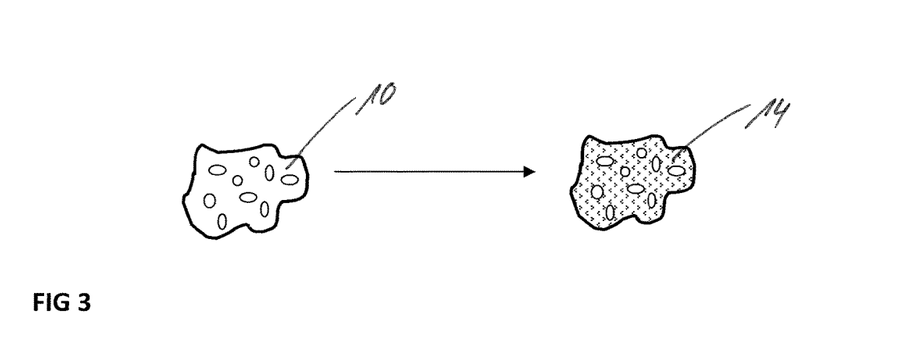
FIG. 3 shows a schematic diagram to illustrate the production of particles of the binder component, in which the particles are transformed into a zeolite.

In a second alternative, as shown in FIG. 3, the particles 10 are transformed into zeolitic particles 14 by means of a suitable treatment known per se with maintenance of their general morphology, i.e., in particular, with maintenance of their mesoporosity. Here, the microstructure of the particles 10 is transformed into the tetrahedral structure consisting of silicon oxide/aluminium oxide tetrahedra which is typical of zeolites. At the same time, the mesostructure or macrostructure of the particles 10 with their mesoporosity is maintained.

Figure 4:
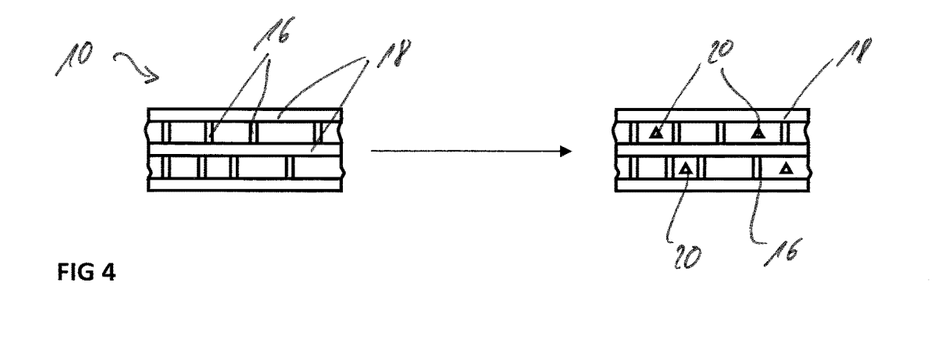
FIG. 4 shows a schematic diagram to explain the catalytic activation of a pillared clay mineral which is inactive in the starting state as binder component by incorporation of catalytically active cells.

In the third embodiment as per FIG. 4, pillared clay minerals (pillared clays) are used for the binder fraction B. These pillared clay minerals consist of clay layers 18 kept at a spacing from one another by pillars 16. Catalytically active sites 20 are intercalated into the free spaces between the clay layers 18 in these catalytically inactive structures.

The particles 10 are thus treated and thus catalytically activated before addition to and mixing into the catalyst composition 4. Preference is given to the total binder fraction B, i.e. the entire inorganic starting powder being catalytically treated in this way. As an alternative, only part is treated. It is also possible to employ mixtures of different inorganic binder components, as are shown by way of example in FIGS. 2 to 4, both catalytically inactive and catalytically activated. It is also possible to mix different starting materials, for example different clay minerals, with one another. The binder components are at least largely homogeneously distributed in the finished catalyst 2.

The finished catalyst 2 preferably has a composition consisting of from 50 to 80% by weight of the catalytically active zeolite and from 20 to 50% by weight of the inorganic binder fraction B, in each case based on the total mass of the sintered catalyst 2 in the final state. Further components such as further additives, etc., can also be present. The total proportion of these is not more than 5% by weight. The proportion of the volatile organic binder fractions O is typically a few percent by weight in relation thereto.

LIST OF REFERENCE NUMERALS

2 Catalyst
4 Catalyst composition
6 Catalyst body
8 Furnace
10 Particle
12 Layer
14 Zeolitic particles
16 Pillar
18 Clay layer
20 Site
Z Zeolite
B Inorganic binder fraction
O Organic binder fraction

The invention claimed is:

1. A process for producing an extruded catalyst, the process comprising extruding a catalyst composition to produce the extruded catalyst body, wherein the catalyst composition comprises an inorganic binder fraction comprising silicate-based particles, at least a portion of which silicate-based particles comprise:
   (a) particles of diatomaceous earth each coated with a layer of a catalytically active zeolite;
   (b) particles of diatomaceous earth comprising an internal catalytically active zeolite structure; or
   (c) both (a) and (b);
such that the silicate-based particles exhibit rheological properties suitable for extrusion.

2. The process according to claim 1, wherein the extruded catalyst composition further comprises a catalytically active component admixed with the inorganic binder fraction.

3. The process according to claim 2, wherein the catalytically active component comprises a molecular sieve-based catalyst, a titanium-vanadium-based catalyst, or a tungsten oxide-cerium oxide-based catalyst.

4. The process according to claim 3, wherein the titanium-vanadium-based catalyst is a titanium-vanadium system, a titanium-vanadium-tungsten system, a titanium-vanadium-tungsten silicon system, a titanium-vanadium-silicon system, a titanium-vanadium-tungsten-iron system, a titanium-vanadium-tungsten-silicon-iron system or a titanium-vanadium-silicon-iron system.

5. The process according to claim 3, wherein the tungsten oxide-cerium oxide-based catalyst is a Fe—W/CeO$_2$ system or a Fe—W/CeZrO$_2$ system.

6. The process according to claim 2, wherein the catalytically active component comprises a crystalline aluminosilicate zeolite.

7. The process according to claim 6, wherein the crystalline aluminosilicate zeolite has the framework structure CHA, AEI, ERI, MFI, BEA, FAU, AFX or FER.

8. The process according to claim 6, wherein the crystalline aluminosilicate zeolite is activated with copper or iron.

9. The process according to claim 1, wherein the diatomaceous earth particles have a mesoporosity or macroporosity with pores having diameters greater than 2 nm.

10. The process according to claim 9, wherein the particles of diatomaceous earth have pores with diameters greater than 5 nm.

11. The process according to claim 1, wherein the particles of the inorganic binder fraction comprises particles of diatomaceous earth, each coated with the layer of catalytically active zeolite.

12. The process according to claim 11, wherein the layer of catalytically active zeolite has a thickness that is less than 20% of the average particle diameter of the particles of diatomaceous earth.

13. The process of claim 11, wherein the particles of diatomaceous earth, each coated with the layer of catalytically active zeolite, are prepared by coating particles of diatomaceous earth with catalytically active zeolite particles.

14. The process of claim 11, wherein the particles of diatomaceous earth, each coated with the layer of catalytically active zeolite, are prepared by coating particles of diatomaceous earth with catalytically inactive zeolite particles to form a coated composition and subjecting the coated composition to an exchange with one or more ions of a catalytically active metal.

15. The process according to claim 1, wherein the inorganic binder comprises particles of diatomaceous earth comprising an internal catalytically active zeolite structure.

16. The method of claim 15, wherein the particles of diatomaceous earth that have been transformed to contain an internal catalytically active zeolite structure are prepared by:
   (a) hydrothermally treating particles of diatomaceous earth under conditions sufficient to crystallize at least a portion of the internal structure of the particles of the diatomaceous earth to form hydrothermally treated particles containing a zeolite structure and having a morphology of the diatomaceous earth particles;
   (b) calcining the hydrothermally treated particles to form calcined particles having a morphology of the diatomaceous earth particles; and
   (c) subjecting the calcined particles to an exchange with one or more ions of a catalytically active metal.

17. The method of claim 16, wherein the one or more ions of a catalytically active metal comprise copper or iron ions.

18. The process according to claim 1, wherein the particles of diatomaceous earth have an average particle diameter in the range of from 1 micron to 100 microns.

19. The process according to claim 18, wherein catalytically active layer thickness is in the range of from 0.5 micron to 10 microns.

20. A catalyst produced by a process according to claim 1.

* * * * *